Oct. 16, 1962    C. M. SLACK ETAL    3,058,897
REACTOR

Filed Sept. 25, 1953    3 Sheets-Sheet 1

Fig. I.

INVENTORS
Charles M. Slack &
Walter G. Roman.
BY
Arthur T. Stratton
ATTORNEY

Fig. 2.

INVENTORS
Charles M. Slack &
Walter G. Roman.
BY
Arthur T. Stratton
ATTORNEY

Oct. 16, 1962  C. M. SLACK ETAL  3,058,897
REACTOR
Filed Sept. 25, 1953  3 Sheets-Sheet 3

Fig. 3.

INVENTORS
Charles M. Slack &
Walter G. Roman.
BY
Arthur T. Stratton
ATTORNEY

United States Patent Office 3,058,897
Patented Oct. 16, 1962

3,058,897
REACTOR
Charles M. Slack, Upper Montclair, N.J., and Walter G. Roman, Pittsburgh, Pa., assignors to Westinghouse Electric Corporation, East Pittsburgh, Pa., a corporation of Pennsylvania
Filed Sept. 25, 1953, Ser. No. 382,328
23 Claims. (Cl. 204—154.2)

This invention relates generally to reactors employing nuclear fissionable material to obtain a readily controllable chain reaction, and more particularly to such a reactor which is especially adapted for a stationary type of plant.

Reactors have been proposed for producing fissionable material by bombarding fertile materials, such as uranium 238 or thorium 232, with neutrons to produce fissionable materials, such as plutonium 239 or uranium 233. Such reactors generally operate at low temperatures and pressures, but require adequate control of the process and some provision for cooling.

Reactors have also been proposed for the production of power, and while these must operate at much higher temperatures and pressures, many of the control and cooling problems are similar to those of a producing reactor.

Reactors have likewise been proposed for a number of other purposes, ranging from purely experimental testing units, through reactors for special purposes, such as materials testing and the production of isotopes.

A number of different types of reactors have been proposed for the above purposes, but they are all subject to serious limitations in use, especially in regard to flexibility and ease of control in operation.

The type of reactor to which this invention relates may be employed for any one or more of the above purposes. It employs a core in which the reaction occurs resulting in the generation of heat.

While this invention is hereinafter specifically disclosed in connection with power production, wherein there is provided a closed high pressure and high temperature coolant system connected with a high pressure core vessel, it should be understood at the outset that this invention is not limited to a power-producing reactor, but many of the features thereof are equally applicable to the other types of reactors mentioned above. In the illustrative form of power producing reactor hereinafter specifically described, some of the heat is extracted in a heat exchanger connected in a primary loop with the reactor core, and such extracted heat may then be employed to generate steam for use in turbo-generating equipment or the like. However, in production and other types of reactors, a high pressure core vessel is not needed, and a simpler form of cooling system may be employed. Thus, while the form of control disclosed herein is for a thermal type of reactor wherein a moderator is employed to slow neutrons emitted as a result of atomic fission to thermal velocity, it will be apparent that such control can be used in reactors useful for purposes other than the production of power. Likewise, certain features disclosed herein specifically related to the production of power and the handling of fuel are not restricted to use solely with a thermal type of reactor, but may be equally useful with other reactor types.

Perhaps the best known type of reactor heretofore employed is the solid fuel heterogeneous type, wherein solid plates or bars of fissionable material are arranged in a precise definite pattern in the core, and a coolant such as water is circulated through the core in the primary circuit. However, this type of reactor requires an exceedingly complex and costly fabrication of the fuel elements, as well as a complex structural support for the fuel elements and passages for coolant flow; the fuel elements are unevenly used or burned up; replacement of fuel elements in the core is exceedingly difficult and necessitates shutdown of the reactor for a relatively long period; and even though unused fissionable material may be recovered, it can only be done by extensive and expensive reprocessing operations.

Another type of reactor which has been suggested is the homogeneous type which employs fissionable material in solution with a liquid, such as water. This type of reactor involves tremendous corrosion problems due to the necessity of circulating the solution in the entire primary loop.

A slurry type of reactor has also been proposed where fissionable material is suspended in a suitable liquid to form a relatively viscous mixture in the form of a slurry. This has the same disadvantage as the homogeneous reactor, and in addition considerable difficulty has been encountered in obtaining and maintaining a satisfactory uniform slurry in a stable manner. Furthermore, both the slurry and homogeneous types of reactor have limitations in the use of fissionable material for low enrichment, due to the impossibility of getting enough of such material in the required volume. In addition, both the solution and slurry types of reactor carry over most of the reactor problems into the entire primary loop since the material circulated in this loop is highly radioactive. Moreover, the amount of fuel required is very high since that located in the part of the primary loop outside the reactor proper contributes nothing to the fission process within the reactor.

In accordance with this invention, a novel form of reactor core is provided, together with controlling, cooling, reflecting and moderating means therefor. Essentially, our reactor comprises the provision of fissionable material in pellet form in a core vessel having means providing for a flow of a moderating fluid upwardly through a bed of the pellets, which flow can be controlled so that the pellets will be raised and separated by the flow of fluid to be actually suspended and separated in the fluid to a degree and in a pattern dependent on the degree of fluid flow. It is obvious that such a reactor does not have disadvantages of known types of reactors, and it also has other advantages which will be hereinafter pointed out as the detailed description of illustrative forms of the invention proceeds.

One object of this invention, therefore, is to provide a novel type of reactor employing fissionable material in the form of solid discrete particles, with means for, in effect, fluidizing the particles by a controlled flow of fluid through a bed of the particles.

Another object of this invention is to provide a novel type of reactor employing fissionable material in the form of discrete solid pellets, having provision for a controllable flow of moderating fluid therethrough to control the geometric pattern occupied by the pellets, and thus control the fission process.

Another object of this invention is to provide a novel power producing system wherein heat is generated in a reactor container having a bed of discrete freely movable solid pellets formed at least in part of fissionable material, and a primary moderator coolant circuit connecting the reactor container with a heat exchanger in such a manner that flow of the coolant through the reactor container causes movement of the pellets in a controllable manner to control the fission process and the generation of heat.

Still another object of this invention is to provide a power producing reactor having provision for flow of a moderator coolant therethrough, with fuel elements in the form of solid freely movable pellets containing fissionable material located in the path of coolant flow, which pellets are of such size and density as to be moved into a state of criticality by predetermined flow of the fluid.

A further object of this invention is to provide a reactor employing fissionable material embodied in a plurality of solid discrete pellets, with hydraulic means for transporting such pellets to and from the reactor chamber.

Another object of this invention is to provide for a reactor employing fissionable material in a plurality of solid discrete pellets, storage chambers for new and used pellets with provision for hydraulically transporting the pellets between the storage chambers and the reactor vessel.

These and other objects of this invention will become more apparent upon consideration of the following detailed description of preferred embodiments thereof, when taken in connection with the attached drawings, in which.

Figure 1:
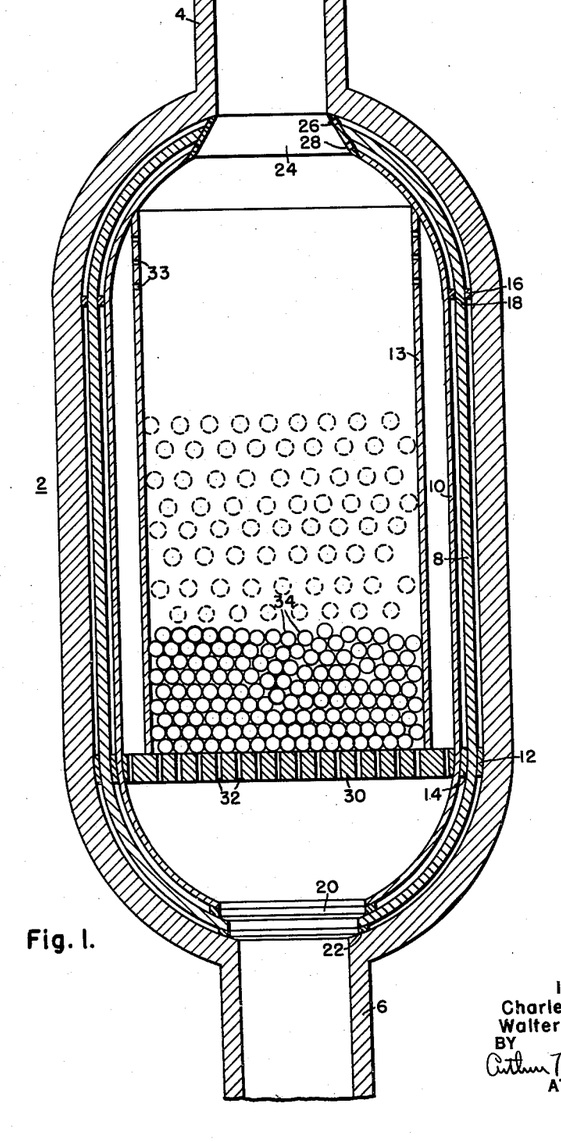
FIGURE 1 is a longitudinal section view of one form of reactor constructed in accordance with this invention.

FIG. 1 illustrates one simplified form which a reactor vessel constructed in accordance with the teachings of this invention may take. In this form of the invention there is provided a relatively thick walled pressure chamber 2, of a suitable high strength material, such as steel. The interior of the chamber may be clad with a corrosion resistant material, such as stainless steel, if desired, although this is not essential if corrosion inhibitors are added to the coolant, or a non-corrosive coolant is used. While the pressure vessel 2 is illustrated as being formed of integral construction, it will be apparent that in practice it will be formed of several sections suitably joined together, as by welding. The top of the pressure vessel is provided with an outlet passage 4, and the bottom of the vessel is provided with an inlet passage 6.

Interiorly of the pressure vessel 2 there are provided an intermediate shielding member 8 and an inner shielding member 10, which substantially conform in shape to the interior shape of the pressure vessel 2, but are spaced therefrom and from each other. These shielding members may be formed of any desired structural material, such as steel or stainless steel. The intermediate shielding member 8 is supported from the pressure vessel 2 by a number of spacing members 12, 16 and 22 spaced along the length of the pressure vessel and secured between the vessel and the intermediate shielding member in any desired manner, for example, as by welding. All of the spacers 12, 16 and 22 are discontinuous circumferentially of the pressure vessel 2 and intermediate shielding member 8, to permit the flow of fluid longitudinally therebetween. The inner shielding member 10 is supported on the intermediate shielding member 8 in a similar manner, namely, by spacing members 14, 18 and 20 which are also spaced along the length of the pressure vessel and preferably spaced at the same locations as spacers 12, 16 and 22, respectively, and secured to the inner shielding member 10 and intermediate shielding member 8 in any desired manner, such as by welding. The spacers 14, 18 and 20 are also discontinuous circumferentially of the pressure vessel to permit the passage of fluid between the inner shielding member 10 and the intermediate shielding member 8.

The upper ends of shielding members 8 and 10 are joined together and to the outer pressure vessel 2 by a top connecting sleeve 24 which is essentially frusto-conical in form, and has outlet openings 28 and 26 leading to the space between the inner and intermediate shielding members 8 and 10, and to the space between the intermediate shielding member 8 and outer pressure vessel 2, respectively.

A transverse partition 30 is adapted to be secured adjacent the lower end of the pressure vessel 2 within the inner shielding member 10, preferably in the vicinity of the spacers 12 and 14, where it is suitably secured to the inner shielding member 10, as by welding or the like. The bottom partition 30 is provided with a relatively large number of perforations 32 most of which open into an inner core container 13 which is essentially cylindrical in form, being supported on top of the bottom partition 30, and extending up into engagement with the upper end of the inner shielding member 10. The core container 13 may be secured in position in any desired way, for example, as by welding or the like, to the bottom partition 30 at its lower end, and to the inner shielding member 10 at its upper end. It will be noted that an annular space is provided between the core container 13 and the inner shielding member 10, and that the bottom partition 30 has at least one perforation leading into this annular space, and that the top of the core container 13 has openings 33 therein serving as outlets for fluid rising in the space between the core container 13 and the inner shielding member 10.

In accordance with this invention, the fuel elements for use in core container 13 are in the form of solid discrete particles, such as pellets 34, which include fissionable material. The particular concentration of fissionable material in pellets 34, and the precise form or manner in which the pellets may be made are not essential to this invention, as it is contemplated that various shapes and forms of pellets 34 may be employed. Similarly, the particular amount of fissionable material and other elements entering into the composition of the pellets may be varied. Thus, insofar as is necessary for the production of heat in core container 13 by an atomic fission process resulting from bombardment of fissionable material by a suitable radiation such as neutrons, it is essential only that at least a number of the pellets 34 include fissionable material, such as uranium 235, plutonium, or the like, and that additional neutrons be emitted as the result of the fission process in the pellets containing fissionable material. Such material may be incorporated in the pellets 34 in a relatively pure state or in the form of an alloy or compound which, in turn, may be clad with a protecting material, such as zirconium or aluminum. This may be done in a number of different ways within the scope of this invention.

Preferably, core container 13 is formed of a material having a low neutron absorbing cross section, such as aluminum or zirconium. Steel may be used, however, for container 13 because even though it has a higher neutron absorbing cross section, the neutrons are scattered by it in an inelastic manner so that it will have neutron reflecting properties. Reflection of neutrons leaking out of the core container 13 back into it may also be accomplished by the relatively thick annulus of coolant immediately surrounding the core in the annular space between the core container 13 and the inner shield 10. Of course, some of the radiation from the core container 13 will be absorbed by the shielding members 8 and 10, and preferably these are proportioned, as by being different in thickness, so that the absorption of radiations in the wall of pressure chamber 2 is low enough as not to cause excessive temperature gradients. However, since some radiations from the core are absorbed in the material of chamber 2 and shields 8 and 10, it is necessary that they be cooled by the flow of coolant in the annular spaces therebetween.

In accordance with this invention, when the reactor is not in operation the pellets will occupy the lower portion of the core container 13 in the form of a bed of pellets 34 due to the action of gravity. In this condition, the fuel elements 34 are in non-critical condition because the ratio of fuel to moderator (coolant) is high, so that relatively few neutrons are slowed down by the moderator to thermal velocity where they are most likely to cause fission. Consequently, they must be moved to a critical condition where the number of neutrons emitted per fission and available for causing another fission approaches unity. In order to move the fuel pellets 34 to such a critical relationship, any suitable moderating fluid is admitted through the inlet passage 6 of the pressure vessel under controlled pressure and flow conditions.

While the fluid admitted to the pressure vessel may be any desired fluid for the purpose of expanding the fuel pellet bed to a critical condition, in accordance with the control aspect of this invention, such a fluid should also be capable of acting as a coolant to conduct heat away from the core for use in producing power, and should be capable of acting as a moderator to slow down the fast neutrons emitted during the fission process. While water is preferred for this purpose, this invention is not limited to this particular fluid, as it will be apparent that a number of other fluids could be used. For example, liquid metals, such as sodium, bismuth, lithium and various alloys thereof, could be used, as well as various organic liquids or inorganic compounds, such as alkaline metal hydroxides.

It will be observed that such a fluid will be distributed by the perforations 32 in the bottom partition 30 into a number of upwardly directed streams of fluid, preferably uniformly distributed throughout the area of the bed of fuel pellets 34. The pressure and flow of this fluid, which also acts as a coolant, can be gradually increased so that the pellets are ultimately forced apart and suspended in the fluid for a predetermined distance upwardly in the core container 13 and in a substantially definite geometrical pattern, such as that shown by the dotted lines in FIG. 1. As this action takes place, the ratio of fuel to moderator decreases, until a point is reached (dependent on the size and density of the pellets) where the moderator-fuel ratio will be high enough to thermalize enough neutrons that at least one will be available per fission to cause another fission, and thus the fission process becomes critical and a chain reaction is maintained. In addition, there will be some general movement and even touching of the pellets, in their fluidized state, which will assist in removing corrosion products from the pellets.

The fluid then passes out of the upper outlet 4 of the pressure vessel and may be circulated in a primary coolant system from which the heat may be abstracted to perform useful work. This may be done in any suitable way, and one such system will be hereinafter specifically referred to. It will be apparent that the heat generated in each pellet 34 by the fission process will be rapidly conducted away by the flow of the coolant fluid, because each pellet is individually supported and surrounded by the rapidly moving fluid. Consequently, the ratio of fuel pellet surface to fuel pellet volume will be large. Moreover, while the pellets may be of various shapes, as indicated above, it is apparent that they may be made of relatively simple form and structure, so that they can be manufactured simply and expeditiously.

As the state of criticality of the reactor is essentially determined by the balance between the neutrons absorbed by the fuel elements which produce fission, the neutrons absorbed but not producing fission, and those lost by leakage from the reactor, when a coolant, such as water, is employed which has moderating properties, the fast neutrons emitted upon fission are slowed down by the moderator so that they are more easily captured by fissionable material to produce additional fissions, and the degree of criticality of the reactor can thus be controlled by varying the ratio of fuel to moderator. If the moderator is a material, such as heavy water ($D_2O$), which does not absorb neutrons to any appreciable degree, then increasing the ratio of moderator to fuel would proportionately increase the number of neutrons slowed down by the moderator relative to those lost by non-fission capture or leakage, and thus increase the number available for fission. This could easily be accomplished in a reactor constructed in accordance with this invention by simply increasing the coolant flow to further expand the fuel bed and thus increase the ratio of moderator to fuel. On the other hand, if the coolant moderator is a material, such as ordinary or normal water, which has an appreciable neutron capture cross section, while control can be obtained in the same way, a limitation is imposed because increased expansion of the fuel bed will also result in increased neutron capture by the moderator and the criticality of the reactor will thus ultimately be decreased.

This type of reactor thus has an inherent safety control should the pumping power fail, because the pellets 34 would then collapse into the bed shown by the solid lines in FIG. 1 where the ratio of moderator to fuel is low and non-critical. Similarly, the reactor will be non-critical for excess coolant flow and excess bed expansion. For a given coolant flow, the state of criticality can also be controlled by introducing different sizes of pellets 34. Such as arrangement would also fail safe should the flow of fluid decrease or stop, and would fail safe should the flow of fluid increase beyond the given amount, inasmuch as either condition will cause a change in moderator to fuel ratio. In most reactors considered heretofore, the ratio of moderator of fuel is fixed subject only to temperature and pressure considerations. However, such ratio can be easily varied in a reactor constructed in accordance with this invention, as indicated above.

It will be observed that some of the fluid flow will be diverted into the annular spaces between the pressure vessel 2, shields 8 and 10 and core container 13, to provide some moderating effect on and the reflection back of neutrons escaping from the core container 13, and to provide for cooling the pressure vessel itself and the interior thereof by upward circulation of a portion of the fluid through these spaces.

Figure 2:
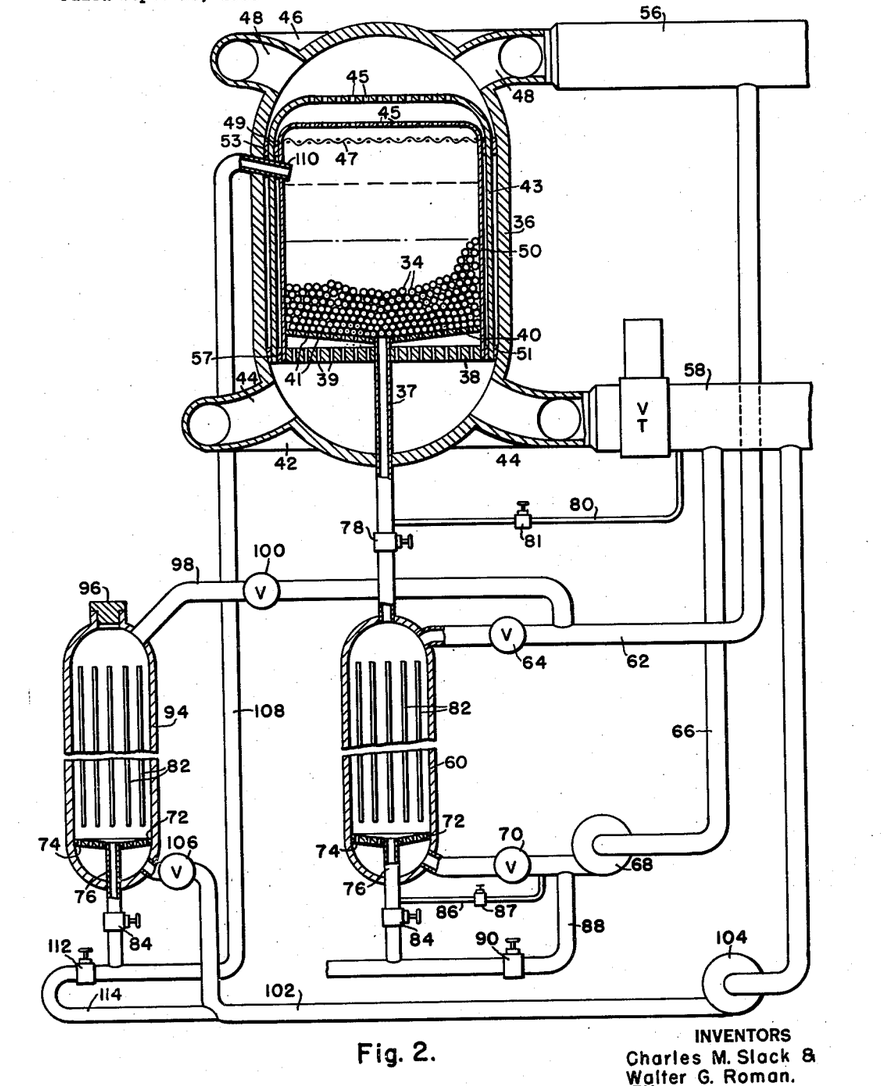
FIG. 2 is a view illustrating another form of reactor and connected fuel handling system, with the reactor and fuel storage compartments being shown in longitudinal section.

A slightly modified form of reactor is shown in FIG. 2 of the drawings wherein the pressure vessel 36 is provided with a core container 50 and intermediate shield member 43 of substantially cylindrical form, and each having a top wall with a number of perforations 45 therein. In addition, if desired the core container 50 has a screen 47 secured transversely thereof, as by welding adjacent its top wall. The core container 50 and shield 43 may be secured in spaced relation in pressure vessel 36 in any desired way, such as by welding to top and bottom spacers 49, 51, 53, 57, as in the reactor of FIG. 1. Similarly, spacers 49, 51, 53, and 57 are also discontinuous circumferentially to permit flow of fluid in the space between core container 50 and shielding member 43, as well as in the space between shielding member 43 and pressure container 36. A bottom partition 38 having a number of perforations 39 evenly distributed over the area thereof is fitted into the open lower end of core container 50, and secured therein in any desired way, as by welding. Inside the core container 50 there is provided a pellet-supporting partition 40, also having a number of apertures 41 distributed substantially uniformly over the surface thereof. The second partition 40 desirably slopes downwardly on all sides to a depressed center portion, which has an opening for a pellet transporting tube 37, extending down through an opening in the first partition 38 and through an opening in the bottom wall of the pressure vessel 36, all for a purpose to be described.

The pressure vessel 36 is provided with a lower annular inlet header 42 which is connected with the lower portion of the pressure vessel 36 beneath the lower partition 38 by connecting inlet conduits 44. Similarly, the pressure vessel 36 is provided with an upper annular outlet header 46 which is connected with the upper end of the pressure vessel 36 above the top wall of shielding member 43 by outlet conduits 48.

The operation of the form of reactor shown in FIG. 2 and described above is very similar to the operation of the form of reactor previously described in connection with FIG. 1 of the drawings and, consequently, will not be repeated in detail. Generally, however, fluid will be supplied under pressure to the inlet header 42 from where it passes into the lower end of the pressure vessel 36 and then flows upwardly with the two partitions 38 and 40 acting to uniformly distribute the flow into a number of vertical upwardly extending streams through the bed of pellets 34. The fluid flowing upwardly through the pressure vessel, in this example, has a minor portion diverted into the space between the vessel and shielding member 43, and into the space between shielding member 43 and the core container 50, and on arrival at the upper end of the pressure vessel 36 it flows out through screen 47 and the perforations 45 in the top walls of core container 50 and shield member 43 and through outlet conduits 48 into the outlet header 46. As in the case of the reactor shown in FIG. 1, the rate of flow may be varied to cause movement of the fuel pellets 34 upwardly to control reactivity subject to the various safety factors and other forms of control mentioned previously in connection with the reactor of FIG. 1. The perforations 45 are made smaller than pellets 34, so that the perforated top walls of the core container 50 and shielding member 43, together with screen 47, positively prevent carry-over of pellets 34 into the coolant system.

The inlet header 42 and outlet header 46 for the pressure vessel 36 are adapted to be connected in a closed primary coolant loop as previously stated in connection with the reactor disclosed in FIG. 1, with one form of such loop being disclosed and hereinafter described in connection with FIG. 3 of the drawings. Thus, the inlet header 42 may be connected to a return conduit 58 which has a throttle valve VT for regulating the flow of fluid from conduit 58 into the lower end of pressure vessel 36. Likewise, the outlet header 46 may be connected to a conduit 56 also in the primary coolant flow circuit.

An important feature of this invention is that the form of fuel elements employed permits them to be inserted and removed from the core container by relatively simple fluid handling means. For this purpose the core container 50 has the pellet transporting tube 37, previously referred to, for removal of the fuel pellet 34 from the core container 50 into a container 60 for used fuel pellets. In order to effect the transport of fuel pellets, the container 60 is preferably connected to the primary coolant system in parallel with the pressure vessel 36 by a conduit 62 connecting the primary coolant conduit 56 with the upper end of the container 60, and being controlled by a valve 64 therein. Another conduit 66 connects the lower end of container 60 with the return conduit 58 of the primary coolant system, and it is controlled by a valve 70 therein, and may also include a pump 68.

The container 60 is provided with a bottom partition 72 adjacent the lower end thereof which extends transversely of the container above its point of connection with conduit 66, and this partition 72 has a number of perforations 74 which are substantially uniformly distributed over the area of the partition. Partition 72 for the container 60 may be dished to have a lower central portion formed with an opening for receiving a pellet transporting tube 76 which extends downwardly through the bottom of the container 60.

The pellet transporting tube 37 of the pressure vessel 36 has a control valve 78 therein exteriorly of the pressure vessel 36. There is also preferably provided a bypass tube 80 of restricted area connecting return conduit 58 with tube 37 on the pressure vessel side of valve 78 and controlled by valve 81. For reasons which will be apparent, the container 60 may have mounted therein a number of plates 82 containing a neutron absorbing material, such as boron, cadmium, hafnium, or the like, to prevent a chain reaction occurring in container 60 when it is filled with fuel pellets 34. The pellet transporting tube 76 is also provided with a valve 84, which has a bypass tube 86 connecting conduit 66 with tube 76, and the latter having a control valve 87. A pellet disposal conduit 88 may be connected to the lower end of the pellet transporting conduit 76 of container 60 and extends to the high pressure side of pump 68, with a valve 90 interposed therebetween.

The container 60 referred to above is for the purpose of storing pellets 34 after they have been used in core container 50 to the point where their usefulness has become impaired, and it is desired to replace them. The way to do this with the system shown in FIG. 2 will now be described. Assuming the reactor to be in operation with the pellets 34 in core container 50 in a fluidized critical state, a predetermined flow of fluid is circulating through the primary coolant system through conduits 56 and 58, and the throttle valve VT is opened a predetermined amount. It is first necessary then to either slightly close the throttle valve VT, or otherwise reduce the flow through the primary coolant system, for example, as by decreasing the speed of the pumps in this system. This will cause the reactor pellets to collapse, although it is preferable that sufficient flow be allowed to continue as to maintain a very slight motion or partially-fluidized condition of the pellets, but with the pellets essentially collapsed into the bed shown in FIG. 2. This will cause cessation of the chain reaction in the reactor, while continued circulation of fluid in the primary coolant system at a reduced rate will act to remove residual heat from the pressure chamber 36 and the fuel elements 34. The pump 68 should next be placed in operation, after which valves 64 and 70 are opened so that the velocity of fluid flow through the container 60 will be slightly above the velocity at which fuel pellets 34 therein would be fluidized or caused to be moved by the fluid flow. Valve 78 in the pellet transporting conduit 37 may then be fully opened, and fluid will flow through the pellet transporting conduit 37 and into the reactor bed in core container 50. The flow of fluid upwardly through pellet transporting conduit 37 is adjusted to be slightly above the velocity required to cause some movement of pellets, yet should be below the free fall velocity thereof, to permit the pellets to fall through the rising column of water in conduit 37 into the container 60. The upward flow through pellet transporting conduit 37 can be adjusted by properly manipulating valves 64 and 70. The movement of pellets 34 downwardly through conduit 37 into container 60 is facilitated by the reduced flow of the primary coolant fluid which should be sufficient, however, to cause some movement or agitation of the pellet bed, to thus facilitate gravitation of the pellets 34 toward the low central opening in the partition 40 from whence they can fall into the conduit 37. The flow of fluid upwardly through the container 60 and conduit 37 acts to control the rate of descent of the pellets.

It is preferable that fluid be circulated through container 60 from the primary coolant system prior to opening valve 78 to permit pellets 34 to drop into the container 60, in order to pre-heat the container, and that have been previously discussed primarily considering the pellets 34 to be fuel elements containing fissionable material, it is apparent that at least some of them may not include fissionable material but may be used for other than power or heat generating purposes; for example, some pellets may be introduced which contain neutron absorbing material, such as boron, cadmium, hafnium, or the like, for controlling the fission process, and/or other pellets may be introduced of a material whose isotopes it is desired to obtain by exposure to the radiation within the core container 50. Also, pellets may be introduced which contain moderating materials, such as hydrogen or carbon. If it is desired to operate the reactor for the production of fissionable material, or partly for this purpose and partly for the production of power, pellets may be introduced into the reactor containing such fertile materials as uranium 238 or thorium 232 for the production of fissionable plutonium 239 and uranium 233. Consequently, this invention is not limited to the use of pellets 34 containing only fissionable material, but other materials in pellet form may advantageously be employed for various purposes and fluidized in the same manner as pellets 34 in the core container 50, and inserted and removed therefrom in a similar way.

Figure 3:
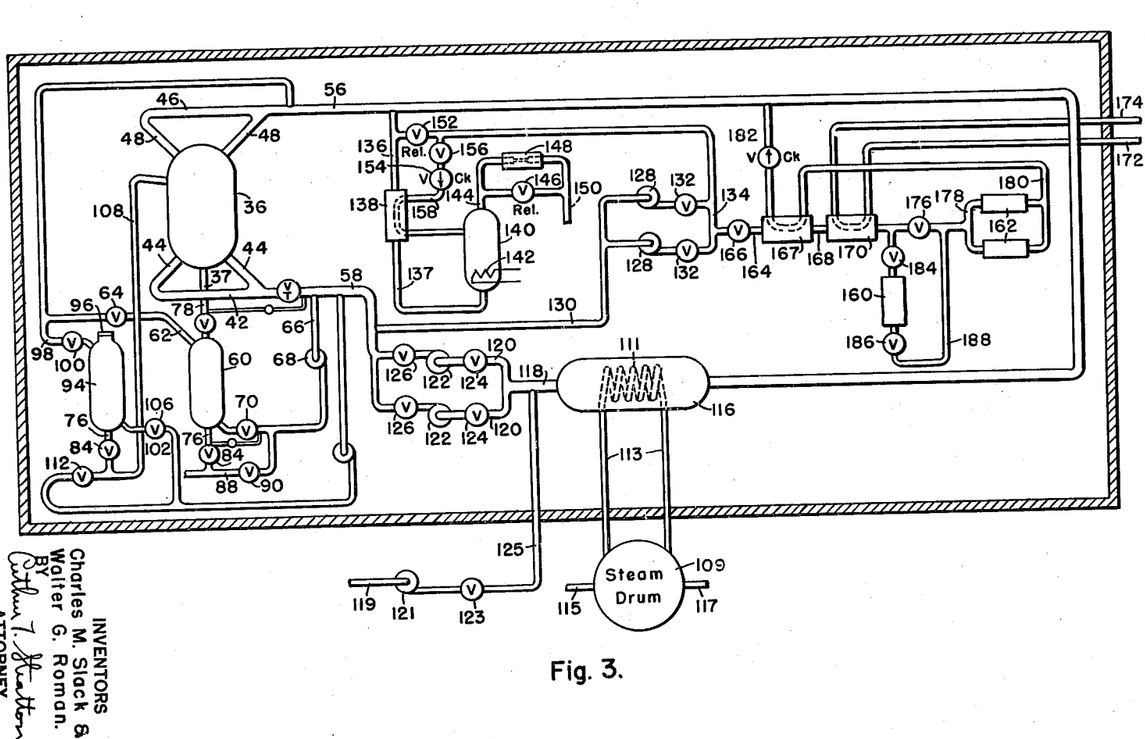
FIG. 3 is a schematic view of a complete fluid system for a reactor such as that shown in FIG. 2.

Referring to FIG. 3 of the drawings, it will be observed that for the production of power the conduits 56 and 58 of the primary coolant circuit may be connected in a closed circuit with a boiler 116 being connected between the conduit 56 and a conduit 118 which leads to a pair of branches 120 in each of which is a main circulating pump 122, having control valves at 124 and 126 at each side thereof.

It will thus be observed that the primary coolant circuit includes pumping means, which is preferably controllable to control the velocity of fluid in the primary coolant circuit, and which supplies coolant fluid under pressure through the throttle valve VT to the bottom of the reactor pressure vessel 36. The fluid flows upwardly through the pressure vessel during which its temperature is raised, and then flows out the top of the pressure vessel to the boiler and back to the pumps.

The boiler 116 may have heat exchanging tubing 111 therein which is connected by conduits 113 with a steam drum 109. Steam may thus be generated in the tubing 111 of the boiler and collected in the steam drum 109, from which it can be withdrawn through conduit 115 for use in a steam turbine or the like. The conduit 117 is for the purpose of supplying feed water to the boiler.

In order to charge the primary coolant circuit with fluid, a source of fluid may be connected to a conduit 119 leading to a charging pump 121 which is connected by a pipe 125 to the primary circuit conduit 118, between the boiler and the main circulating pumps 122, with the conduit 125 being under the control of a valve 123.

The primary coolant circuit may, if desired, be provided with a coolant control system containing various control elements to maintain the coolant in proper condition. The illustrative control system shown in FIG. 3 includes control pumps 128 for circulating fluid through the control system. The control pumps 128 have their inlets connected to a conduit 130, and this, in turn, is connected to the primary coolant circuit conduit 58, so that some of the coolant may be withdrawn from the primary circuit for processing in the control system. The outlets of control pumps 128 are each controlled by a valve 132 and discharge into a conduit 134.

One part of the control system includes a pressurizer 140 for maintaining constant pressure and for degasifying the coolant liquid. This part of the control system has a conduit 136 connected to the primary coolant circuit conduit 56 which communicates with a heat exchanger 138, and from there by way of a conduit 137 to the pressurizing and degasifying container 140. In a water cooled system, the container 140 may include heating means, such as the electrical resistance heater 142, to raise the temperature of the incoming water to the temperature required to provide a volume of steam at system pressure in the top, and the top of this container is in communication with a conduit 144 having one branch containing a pressure relief valve 146, and another branch including a flow plug 148, which lead into a conduit 150 which may exhaust to the atmosphere. Any dissolved gases will collect in the steam and may be exhausted through the flow plug 148 which has a capillary outlet for that purpose.

The conduit 134 which receives the output of control pumps 128 has one branch connected to the conduit 136 leading to main conduit 56 through a check and relief valve 152, and it has another branch conduit 158 which extends through the heat exchanger 138 to the pressurizer and degasifying container 140, with this branch conduit being controlled by a valve 156, and having therein a check valve 154.

In the operation of the portion of the control system described above, under transient pressure conditions, it is apparent that, depending upon the relative pressures, the coolant liquid may flow in either direction through conduit 136, and the volume of steam and gas in the degasifier and pressurizing container 140 will act as a cushion to absorb and reduce pressure surges. When control pumps 128 are in operation, their outlet conduit 134 will obviously be at an elevated pressure, and dependent again upon the pressure in the degasifying and pressurizing container 140, liquid taken from the primary coolant conduit 58 may be returned directly to the primary coolant conduit 56 through check and relief valve 152, or it may flow through heat exchanger 138 and the degasifying container 140 when valve 156 is open, as permitted by check valve 154, and then through conduit 137, heat exchanger 138 and conduit 136 into the primary circuit conduit 56. It is, of course, apparent that any excess pressure in the container 140 will be relieved and vented to atmosphere by the conduit 150.

The coolant control system may also illustratively include liquid purifying means, such as an ion exchanger 160 which may contain any suitable ion exchanging medium, such as a synthetic resinous material or the like, as well as filters 162. Coolant taken from the primary coolant circuit conduit 58 by control pumps 128 may, when valve 166 is open, be delivered through conduit 164 from the pumps, through a heat exchanger 167 to a connecting conduit 168, and through a second heat exchanger 170, if desired. The second heat exchanger 170 may be supplied with an outside independent cooling medium by way of the conduits 172 and 174. After leaving the second heat exchanger 170, liquid may continue into the header 178 when valve 176 is open, then through the filters 162 and into the conduit 180 which returns the fluid through the first heat exchanger 167 and check valve 182 to the primary coolant circuit conduit 56.

If it is desired that the liquid in the coolant circuit be additionally subjected to the action of ion exchanger 160, valve 176 may be closed and valve 184 opened in the conduit leading to the ion exchanger 160, as well as the valve 186 in the conduit 188 which leads from the ion exchanger back to the header 178, and thence through the filters 162 and back into the coolant circuit.

The coolant control system which has been described is merely illustrative of a number of controls which might be imposed on the primary coolant circuit for a power producing reactor constructed in accordance with this invention. Such a control system may be operated continuously or intermittently, as desired, to degasify and purify the liquid circulating in the primary coolant circuit. It is apparent that the control system disclosed is capable of removing a number of different types of impurities which may be imparted to the coolant liquid in the reactor, including impurities of both gaseous and solid types.

Of course, if a reactor constructed in accordance with this invention is operated only to produce fissionable this flow be continued after all of the pellets 34 have fallen into container 60 in order to remove residual heat in the pellets themselves, due to the radioactive decay of fission products and the release of delayed neutrons by the fuel. Thereafter, the valve 78 in the pellet transporting conduit 37 may be closed and the fluid flow through container 60 reduced below the velocity at which pellets 34 are fluidized or moved by suitably adjusting valves 64 and 70.

It will usually be desirable to let the fuel pellets 34 remain in storage containers 60 long enough to permit substantial decay of the gamma ray activity of the fission products, prior to transporting them to a reprocessing location. After a suitable storage period in the container 60, the fuel pellets 34 may be transported therefrom to a reprocessing location by again increasing the flow upwardly through the container 60 by proper adjustment of valves 64 and 70 to cause some slight movement of the fuel pellets which, however, would not prevent falling of the pellets through the pellet transporting conduit 76. The valve 90 would then be opened to create a high velocity flow through the conduit 88 to the reprocessing area. The valve 84 in the pellet transporting conduit 76 could then be opened and fluid would flow up into the container 60 through the conduit 76 at a velocity somewhat above the fluidizing velocity of the pellets but below their free fall velocity. This velocity can be adjusted by manipulating valves 64 and 70. This would then permit the pellets to fall through the conduit 76 into the high velocity flow in conduit 88 for transportation in this conduit to the reprocessing area. Obviously, after removal of the pellets from container 60, this part of the system could be returned to its original condition by shutting down pump 68 and closing all valves 64, 70, 84 and 90, the valve 78 having previously been closed.

The purpose of bypass tube 80 is to provide a small flow of coolant, as regulated by valve 78 in order to cool any pellets which may be in this portion of the tube 37 which may generate heat due to their being in a neutron flux field. Similarly, bypass tube 86 can have its valve 87 adjusted to permit a coolant flow through any pellets in tube 76 when valve 84 is closed, to conduct away heat generated due to gamma ray radiation from fission fragments contained in the used pellets.

Provision is also made in the system illustrated in FIG. 2 for transporting fresh fuel pellets 34 from a storage container 94 therefor, into the core container 50 by hydraulic means. The storage container 94 for fresh fuel pellets is substantially identical in construction with the container 60 for used pellets, and consequently the identical parts have been identified by the same reference numerals, and will not again be described in detail. One difference in construction of container 94 is that it has a top opening which is adapted to be closed by a removable plug 96, which may be removably secured in the top opening in any desired way (not shown). The container 94 is also adapted to be connected to the primary coolant circuit in parallel with the pressure vessel 36, and also in parallel with the storage container 60. This is accomplished by a conduit 98 connecting the upper end of container 94 and the conduit 62 previously referred to, and having a valve 100 therein. A second conduit 102 connects the lower end of storage container 94 beneath the partition 72 therein with the return conduit 58 of the primary coolant circuit through a pump 104, and under the control of a valve 106 located between the pump 104 and container 94.

The pellet transporting conduit 76 of container 94 is connected to the reactor feed conduit 108 which extends from conduit 102 to the upper end of the pressure vessel 36, with the outlet portion 110 thereof extending through the side walls of the pressure vessel 36, shielding member 43, and core container 50 adjacent the upper ends thereof but beneath the top walls of the core container and shielding member and beneath the screen 47. The feed conduit 108 is under the control of a valve 112 therein located between pellet transporting conduit 76 of container 94 and conduit 102, being preferably provided with a restricted bypass tube 114.

It will now be seen that if a charge of fresh fuel pellets 34 has been introduced into container 94 through its removable top plug 96, and the plug has been closed, the container 94 can be brought up to temperature and pressure slowly by starting the pump 104 and opening valves 106 and 100. The bed of pellets 34 in container 94 is then slightly fluidized by adjusting the velocity of flow through container 94 with valves 100 and 106, to be sufficient to cause movement of the pellets 34 contained therein but being below the free fall velocity of the pellets. Valve 112 in the feed conduit is then opened creating a high velocity flow of water through this conduit into the upper end of the core container 50. The valve 84 in the pellet transporting conduit 76 for container 94 is then opened, and further adjustment of the vertical velocity in conduit 76 may then be made if required, to be sufficient to cause movement or partial fluidization of the pellets, but being below the free fall velocity thereof. The new fuel pellets 34 will then fall through the conduit 76 into the horizontal flow of fluid in conduit 108 and be carried upward and discharged into the core container 50. When all of the fuel pellets 34 in container 94 have been discharged, valves 84, 100, 106 and 112 can be closed, and pump 104 shut down. Thereafter, the reactor may be brought back to power producing condition by increasing the flow in the primary coolant circuit in order to expand the pellet bed in core container 50 the proper amount for criticality.

It will be recalled that one advantage of the previously discussed homogeneous solution type of reactor was in the ability to replace portions of the solution to thus maintain its reactivity in spite of fuel burn up and the building up of poisons and the like in the reactor. However, it is clear that a reactor constructed in accordance with this invention offers an even better solution to this problem since the fuel pellets 34 can be easily removed by relatively simple hydraulic means to a location outside of the reactor core container, without affecting the coolant fluid, and without interrupting operation of the reactor itself. Obviously, if desired, a degree of control may be exercised by removal of used pellets or addition of fresh pellets in any desired amount less than total replacement of the amount of fuel pellets in the reactor core container 50. Thus, the reactivity may be decreased by removing only a few of the fuel pellets 34 from the core container 50 into the storage container 60. Similarly, if it is desired to increase reactivity in core container 50, only a few fresh pellets may be introduced from storage container 94 in the manner indicated above. Such a control may be used specifically for overriding fissionable material depletion or poison build-up which tends to decrease reactivity in the core container 50, as well as for counteracting temperature and pressure effects on reactivity. It is well known that during operation the critical nature of a reactor does not remain constant due to a number of factors, such as burn up of the fuel elements, introduction of impurities and poisons. The relatively simple means disclosed in FIG. 2 for introducing fresh pellets and removing used pellets from a reactor core container can be readily employed to maintain the reactor core in a state of equilibrium so far as the fission process therein is concerned.

In addition to the foregoing, it may be desirable to sample the condition existing in the core container 50 at any time, and this may be readily done by removing a relatively few pellets 34 into the container 60 from whence they may be conducted to a testing location rather than to a reprocessing location by means of the conduit 88.

Moreover, while the reactors shown in FIGS. 1 and 2 material or for experimental purposes, the boiler 116 could be replaced by a simple low temperature and low pressure heat exchanger. In this case, if a source of fresh, pure cooling water is available, the boiler 116 or heat exchanger could be entirely eliminated along with the entire fluid control system, and the pure water admitted directly to the reactor and directly discharged therefrom.

Having described preferred embodiments of the invention in accordance with the patent statutes, it is desired that this invention be not limited to the specific constructions referred to herein for illustrative purposes, because it will be apparent, particularly to persons skilled in this art, that this invention may be embodied in a number of other illustrative forms.

We claim as our invention:

1. A reactor comprising, a closed chamber having a coolant inlet adjacent the bottom and a coolant outlet adjacent the top thereof, a core container supported in said chamber and having a perforate bottom wall disposed above the inlet for supporting a bed of solid freely movable pellets at least some of which include fissionable fuel material, said container having an upper outlet opening in communication with said chamber outlet, the perforations in said partitions being relatively closely spaced and uniformly distributed to effect uniform distribution of coolant flow from said inlet upwardly through the container, and variable means for supplying a moderating coolant to said inlet in an amount and at a pressure sufficient to force said pellets upwardly in separated relation to a variable degree to achieve a fluid to fuel ratio such as to sustain a chain reaction.

2. A reactor comprising, a closed chamber having a coolant inlet adjacent the bottom and a coolant outlet adjacent the top thereof, a core container supported in said chamber and having a perforate bottom wall spaced above said inlet for supporting a bed of solid freely movable pellets at least some of which include fissionable fuel material, the upper end of said container being open and in communication with said chamber outlet, and variable means for supplying a moderating coolant to said inlet in an amount and at a pressure sufficient to force said pellets upwardly in separated relation to a variable degree to achieve a fluid to fuel ratio such as to sustain a chain reaction.

3. A reactor comprising, a closed chamber having a coolant inlet adjacent the bottom and a coolant outlet adjacent the top thereof, a core container supported in said chamber and having a perforate bottom wall spaced above said inlet for supporting a bed of solid freely movable pellets at least some of which include fissionable fuel material, the side walls of said core container being spaced from the side walls of said chamber to form an annular neutron reflecting compartment, the upper end of said container being open and in communication with said chamber outlet, and variable means for supplying a moderating coolant to said inlet in an amount and at a pressure sufficient to force said pellets upwardly in separated relation to a variable degree to achieve a fluid to fuel ratio such as to sustain a chain reaction.

4. A reactor comprising, a closed chamber having a coolant inlet adjacent the bottom and a coolant outlet adjacent the top threof, a core container supported in said chamber and having a perforate bottom wall spaced above said inlet for supporting a bed of solid freely movable pellets at least some of which include fissionable fuel material, the side walls of said core container being spaced from the side walls of said chamber to form an annular neutron reflecting compartment, restricted inlet means for the lower end of said reflecting compartment providing access to said chamber inlet, restricted outlet means for the upper end of said reflecting compartment providing access to said chamber outlet, the upper end of said container being open and in communication with said chamber outlet, and variable means for supplying a moderating coolant to said inlet in an amount and at a pressure sufficient to force said pellets upwardly in separated relation to a variable degree to achieve a fluid to fuel ratio such as to sustain a chain reaction and to provide for limited flow of coolant through said reflecting compartment.

5. A reactor comprising, an upright closed tubular chamber having a coolant inlet adjacent the bottom and a coolant outlet adjacent the top thereof, a plurality of spaced concentric tubular members in said chamber forming a plurality of outer annular spaces and an inner cylindrical core container, a perforate bottom for said core container above the chamber inlet for supporting a bed of solid freely movable pellets at least some of which include fissionable fuel material, each of said annular spaces having restricted inlet means at the lower end opening to said chamber inlet and restricted outlet means at the top opening to said chamber outlet, means providing a moderating coolant flow under pressure to said chamber inlet to provide a main flow through said bed of pellets sufficient to move said pellets upwardly so that they are separated in separated relation to a variable degree to achieve a fluid to fuel ratio such as to sustain a chain reaction, and subsidiary flow through said annular spaces to provide cooling of the pellets and chamber while providing thermal and reflector shielding regions for said core container.

6. A method of promoting a chain reaction comprising, providing a bed of discrete solid pellets at least some of which include fissionable fuel material in a laterally confined zone, and passing a gradually increasing flow of moderating fluid upwardly through said bed to cause the pellets to rise and be separated and suspended by said fluid until the ratio of fluid to fuel is sufficiently high to promote a chain reaction.

7. A method of promoting a chain reaction comprising, providing a bed of discrete solid pellets at least some of which include fissionable fuel material in a laterally confined zone, and passing a gradually increasing flow of moderating fluid upwardly through said bed to cause the pellets to rise and be separated and suspended by said fluid until the ratio of fluid to fuel is sufficiently high to promote a chain reaction, and thereafter varying said flow of fluid to control the degree of criticality of said reaction.

8. A method of promoting a chain reaction and extracting heat therefrom comprising, providing a bed of discrete solid pellets disposed in a laterally confined zone with at least some of said pellets including fissionable fuel material, and passing a gradually increasing flow of moderating fluid upwardly through said bed to cause the pellets to rise and be separated and suspended by said fluid until the ratio of fluid to fuel is sufficiently high to promote a chain reaction and extracting heat imparted to said fluid from said pellets after passage of the fluid through said bed.

9. A power plant comprising, a pressure reactor vessel having a lower fluid inlet and an upper outlet connected in a closed primary coolant circuit, a heat exchanger in said circuit, pumping means in said circuit for circulating a moderating fluid under pressure through said circuit in a direction to cause upward flow through the reactor vessel, a core container supported in said vessel and having a perforate bottom wall disposed above the fluid inlet for supporting a bed of solid freely movable pellets disposed in the path of fluid flow with at least some of said pellets including fissionable fuel material, said container having an upper outlet opening in communication with said vessel outlet, and throttle valve means in said circuit between the pumping means and reactor vessel for controlling the flow of fluid through the vessel and the container from a minimum value insufficient to cause appreciable disturbance of the pellet bed to a higher value where the pellets are moved upwardly in spaced relation to increase the fluid to fuel ratio to a point where a nuclear chain reaction will occur, and each pellet is then contacted on all sides by the coolant.

10. A power plant comprising, a reactor pressure vessel having a lower fluid inlet and an upper outlet connected in a closed primary coolant circuit, a heat exchanger in said circuit, pumping means in said circuit for circulating a moderating fluid under pressure through said circuit in a direction to cause upward flow through the reactor vessel, a core container supported within said vessel and having a perforate bottom wall disposed above the fluid inlet for supporting a bed of solid freely movable pellets disposed in the path of fluid flow with at least some of said pellets including fissionable fuel material, said container having an upper outlet opening in communication with said vessel outlet, and means for controlling the flow of fluid through the vessel and the container from a minimum value insufficient to cause appreciable disturbance of the pellet bed to a higher value where the pellets are moved upwardly in spaced relation to increase the fluid to fuel ratio to a point where a nuclear chain reaction will occur and each pellet is then contacted on all sides by the coolant.

11. A power plant comprising, a reactor pressure vessel having a lower fluid inlet and an upper outlet connected in a closed primary coolant circuit, a heat exchanger in said circuit, pumping means in said circuit for circulating a moderating fluid under pressure through said circuit in a direction to cause upward flow through the reactor vessel, a perforate partition in said reactor vessel above the fluid inlet for supporting a bed of solid freely movable pellets disposed in the path of fluid flow with at least some of said pellets including fissionable fuel material, means for controlling the flow of fluid through the vessel from a minimum value insufficient to cause appreciable disturbance of the pellet bed to a higher value where the pellets are moved upwardly in spaced relation to increase the fluid to fuel ratio to a point where a nuclear chain reaction will occur and each pellet is then contacted on all sides by the coolant, a pellet storage container, a pellet transfer conduit connecting an upper portion of said container with an opening in the partition of the reactor vessel, and means for opening and closing said transfer conduit to permit said pellets to fall into the storage container when the conduit is open and fluid flow through the reactor vessel is reduced.

12. A power plant comprising, a reactor pressure vessel having a lower fluid inlet and an upper outlet connected in a closed primary coolant circuit, a heat exchanger in said circuit, pumping means in said circuit for circulating a moderating fluid under pressure through said circuit in a direction to cause upward flow through the reactor vessel, a perforate partition in said reactor vessel above the fluid inlet for supporting a bed of solid freely movable pellets disposed in the path of fluid flow with at least some of said pellets including fissionable fuel material, means for controlling the flow of fluid through the vessel from a minimum value insufficient to cause appreciable disturbance of the pellet bed to a higher value where the pellets are moved upwardly in spaced relation to increase the fluid to fuel ratio to a point where a nuclear chain reaction will occur and each pellet is then contacted on all sides by the coolant, a pellet storage container, a pellet transfer conduit extending from the lower portion of said container and having means to open and close the conduit to permit pellets from the container to fall through the conduit when open, an auxiliary inlet line leading from the primary coolant circuit to the upper end of the reactor vessel, and said pellet transfer conduit opening into said auxiliary inlet line for the hydraulic transport of pellets from said container by fluid flow in said auxiliary line into said reactor vessel.

13. A power plant comprising, a reactor pressure vessel having a lower fluid inlet and an upper outlet connected in a closed primary coolant circuit, a heat exchanger in said circuit, pumping means in said circuit for circulating a moderating fluid under pressure through said circuit in a direction to cause upward flow through the reactor vessel, a perforate partition in said reactor vessel above the fluid inlet for supporting a bed of solid freely movable pellets disposed in the path of fluid flow with at least some of said pellets including fissionable fuel material, means for controlling the flow of fluid through the vessel from a minimum value insufficient to cause appreciable disturbance of the pellet bed to a higher value where the pellets are moved upwardly in spaced relation to increase the fluid to fuel ratio to a point where a nuclear chain reaction will occur and each pellet is then contacted on all sides by the coolant, a pellet storage container, a first pellet transfer conduit connecting an upper portion of said container with an opening in the partition of the reactor vessel, means for opening and closing said transfer conduit to permit said pellets to fall into the storage container when the conduit is open and fluid flow through the reactor vessel is reduced, a second pellet storage container, a second pellet transfer conduit extending from the lower portion of said second container and having means to open and close said second conduit to permit pellets from the second container to fall through said second conduit when open, an auxiliary inlet line leading from the primary coolant circuit to the upper end of the reactor vessel, and said second pellet transfer conduit opening into said auxiliary inlet line for the hydraulic transport of pellets from said second container by fluid flow in said auxiliary line into said reactor vessel.

14. A reactor comprising, a closed chamber having a coolant inlet adjacent the bottom and a coolant outlet adjacent the top thereof, a core container supported within said chamber and having a perforate bottom wall disposed above the chamber inlet for supporting a bed of solid freely movable pellets at least some of which include fissionable fuel material and others of which contain fertile material capable of being transformed into fissionable material, said container having an upper outlet opening in communication with said chamber outlet, means for directing a flow of moderating fluid through said chamber inlet and upwardly through the bottom wall of the container, and variable means for supplying such a fluid to said flow directing means in an amount and at a pressure sufficient to force said pellets upwardly in separated relation to a variable degree to achieve a fluid to fuel ratio such as to sustain a chain reaction.

15. Apparatus of the type described comprising, a reactor vessel having a lower fluid inlet and an upper outlet connected in a primary coolant circuit, pumping means in said circuit for circulating fluid under pressure through said circuit in a direction to cause upward flow through the reactor vessel, a perforate partition in said reactor vessel above the fluid inlet for supporting a bed of solid freely movable pellets disposed in the path of fluid flow with at least some of said pellets including fissionable material, means for controlling the flow of fluid through the vessel, an auxiliary pellet handling fluid circuit connected to the primary coolant circuit in parallel with the reactor vessel and including a pellet storage container, means controlling fluid flow through said auxiliary circuit, a pellet transfer conduit connecting the upper portion of said container with an opening in the partition of the reactor vessel, and means for opening and closing said transfer conduit to permit said pellets to fall into the storage container when the conduit is open and fluid flow through the reactor vessel is reduced.

16. Apparatus of the type described comprising, a reactor vessel having a lower fluid inlet and an upper outlet connected in a primary coolant circuit, pumping means in said circuit for circulating fluid under pressure through said circuit in a direction to cause upward flow through the reactor vessel, a perforate partition in said reactor vessel above the fluid inlet for supporting a bed of solid freely movable pellets disposed in the path of fluid flow with at least some of said pellets including fissionable material, means for controlling the flow of fluid through the vessel, an auxiliary pellet handling fluid circuit connected to the primary coolant circuit in parallel with the reactor vessel and including parallel connected pellet storage containers, means controlling fluid flow through said auxiliary circuit, a pellet transfer conduit connecting the upper portion of one of said containers with an opening in the partition of the reactor vessel, means for opening and closing said transfer conduit to permit said pellets to fall into the storage container when the conduit is open and fluid flow through the reactor vessel is reduced, and a second pellet transfer conduit connecting the lower end of the other storage container with the upper end of the reactor vessel, so that fresh pellets may be introduced into the reactor vessel from said other storage container.

17. Apparatus of the type described comprising, a reactor vessel having a lower fluid inlet and an upper outlet connected in a primary coolant circuit, pumping means in said circuit for circulating fluid under pressure through said circuit in a direction to cause upward flow through the reactor vessel, a perforate partition in said reactor vessel above the fluid inlet for supporting a bed of solid freely movable pellets disposed in the path of fluid flow with at least some of said pellets including fissionable material, means for controlling the flow of fluid through the vessel, a pellet storage container, a pellet transfer conduit connecting an upper portion of said container with an opening in the partition of the reactor vessel, and means for opening and closing said transfer conduit to permit said pellets to fall into the storage container when the conduit is open and fluid flow through the reactor vessel is reduced.

18. Apparatus of the type described comprising, a reactor vessel having a lower fluid inlet and an upper outlet connected in a primary coolant circuit, pumping means in said circuit for circulating fluid under pressure through said circuit in a direction to cause upward flow through the reactor vessel, a perforate partition in said reactor vessel above the fluid inlet for supporting a bed of solid freely movable pellets disposed in the path of fluid flow with at least some of said pellets including fissionable material, means for controlling the flow of fluid through the vessel, a pellet transfer conduit extending from the lower portion of said container and having means to open and close the conduit to permit pellets from the container to fall through the conduit when open, an auxiliary inlet line leading from the primary coolant circuit to the upper end of the reactor vessel, and said pellet transfer conduit opening into said auxiliary inlet line for the hydraulic transport of pellets from said container by fluid flow in said auxiliary line into said reactor vessel.

19. Apparatus of the type described comprising, a reactor vessel having a lower fluid inlet and an upper outlet connected in a primary coolant circuit, pumping means in said circuit for circulating fluid under pressure through said circuit in a direction to cause upward flow through the reactor vessel, a perforate partition in said reactor vessel above the fluid inlet for supporting a bed of solid freely movable pellets disposed in the path of fluid flow with at least some said pellets including fissionable material, means for controlling the flow of fluid through the vessel, a pellet storage container, a first pellet transfer conduit connecting an upper portion of said container with an opening in the partition of the reactor vessel, means for opening and closing said transfer conduit to permit said pellets to fall into the storage container when the conduit is open and fluid flow through the reactor vessel is reduced, a second pellet storage container, a second pellet transfer conduit extending from the lower portion of said second container and having means to open and close said second conduit to permit pellets from the second container to fall through said second conduit when open, an auxiliary inlet line leading from the primary coolant circuit to the upper end of the reactor vessel, and said second pellet transfer conduit opening into said auxiliary inlet line for the hydraulic transport of pellets from said second container by fluid flow in said auxiliary line into said reactor vessel.

20. Apparatus of the type described comprising, a reactor vessel having a lower fluid inlet and an upper outlet connected in a primary coolant circuit, pumping means in said circuit for circulating fluid under pressure through said circuit in a direction to cause upward flow through the reactor vessel, a perforate partition in said reactor vessel above the fluid inlet for supporting a bed of solid freely movable pellets, means for controlling the flow of fluid through the vessel, an auxiliary pellet handling fluid circuit connected to the primary coolant circuit in parallel with the reactor vessel and including a pellet storage container, means controlling fluid flow through said auxiliary circuit, a pellet transfer conduit connecting the upper portion of said container with an opening in the partition of the reactor vessel, and means for opening and closing said transfer conduit to permit said pellets to fall into the storage container when the conduit is open and fluid flow through the reactor vessel is reduced.

21. A reactor comprising, a core container having a perforate bottom wall adapted to support a bed of solid freely movable pellets at least some of which include fissionable fuel material, means for directing a flow of moderating fluid upwardly through the bottom wall of the container, a fluid outlet in the upper portion of said container, means for supplying fluid to said flow directing means in an amount and at a pressure sufficient to force said pellets upwardly in separated relation to a variable degree to achieve a fluid to fuel ratio such as to sustain a chain reaction, and means preventing the escape of said pellets through said fluid outlet.

22. A method of promoting a chain reaction comprising, providing a bed of discrete solid pellets in a laterally confined zone with at least some of said pellets including fissionable fuel material, passing a gradually increasing flow of moderating fluid upwardly through said bed to cause the pellets to rise and be separated and suspended by said fluid until the ratio of fluid to fuel is sufficiently high to promote a chain reaction, and at least partially controlling said chain reaction by at least one of the steps of adding and of withdrawing said pellets relative to said bed.

23. A reactor comprising, a closed chamber having a coolant inlet adjacent the bottom and a coolant outlet adjacent the top thereof, a core container supported within said chamber and having a perforate bottom wall disposed above the chamber inlet for supporting a bed of solid freely movable pellets at least some of which include fissionable fuel material, means for directing flow of a neutron moderating fluid upwardly through the chamber inlet and the bottom wall of the container, said container having an upper outlet opening in communication with the chamber outlet, variable means for supplying such a fluid to said flow directing means in an amount and at a pressure sufficient to force said pellets upwardly in separated relation to a variable degree to achieve a fluid to fuel ratio such as to sustain a chain reaction, and means coupled in communication with said core container for adding and withdrawing pellets relative to said container to vary further the fluid to fuel ratio so that said chain reaction is at least partially controlled thereby.

References Cited in the file of this patent

UNITED STATES PATENTS

| | | |
|---|---|---|
| 2,548,875 | Degnen | Apr. 17, 1951 |
| 2,614,038 | Barr | Oct. 14, 1952 |
| 2,631,921 | Odell | Mar. 17, 1953 |
| 2,677,608 | McKay | May 4, 1954 |
| 2,708,656 | Fermi et al. | May 17, 1955 |
| 2,743,225 | Ohlinger et al. | Apr. 24, 1956 |

(Other references on following page)